Patented Mar. 2, 1937

2,072,508

UNITED STATES PATENT OFFICE 2,072,508

RUBBER-RESIN DISPERSIONS

Osborne L. Mahlman, Kenmore, and Raymond C. Benner, Niagara Falls, N. Y., assignors, by mesne assignments, to The Carborundum Company, Niagara Falls, N. Y., a corporation of Delaware No Drawing. Original application July 1, 1931, Serial No. 548,254. Divided and this application December 11, 1933, Serial No. 701,868

8 Claims. (Cl. 134—17)

This invention relates to a dispersion of coagulated rubber in a normally liquid resin, and a process of preparing the same, and is a division of our co-pending application Serial No. 548,254, filed July 1, 1931.

Certain liquids, such as benzol or carbon tetrachloride, modify the properties of coagulated rubber, swelling it to form a jelly or "solution" as it is sometimes called. Other liquids such as alcohol or water, have no effect on rubber immersed in them but may be mechanically mixed with rubber by kneading "broken down" sheet rubber in the presence of the liquid; for example, in a dough mixer. The amount of liquid which can be mixed into rubber is, however, very small, amounting in the case of water, for example, to about 20%. The mixture of rubber and water is somewhat "shorter" than rubber alone but still decidedly tough. If kneading be continued beyond the limit of miscibility, however, the additional liquid simply stays in the bowl of the mixer and cannot be forced into the solid rubber-liquid mass.

We have discovered that certain liquids which are not regarded as solvents of rubber are miscible with coagulated rubber to a much greater extent than any previously known. If, for example, a mass of sheet rubber be mixed with a liquid phenolic condensation product (commonly called an "A stage" resin) such as that sold to the trade as "Redmanol AR-540", it is possible to mix into the rubber as much as 2 parts resin to 1 part rubber whereas the limit of miscibility of water in rubber, as stated above, is only about 20% water based on the rubber content. Other liquids also exhibit this property as will be described later in this specification. Such liquids are not rubber solvents and do not form rubber solutions, but rather a true rubber dispersion.

A mixture of resin and rubber in proportions corresponding to the limit of miscibility of rubber and water has much the appearance of a rubber-water mixture except for the brown color imparted by the resin as compared to the white appearance which is characteristic of rubber admixed with water. Further kneading in the presence of the resin results in the resin-rubber mixture becoming softer and shorter until finally, when conditions are properly adjusted as will be described later, the solid mass breaks up into very small particles and disperses in the liquid to form a paste.

One way of preparing the dispersion which we have found to be very convenient, is described below. It should be understood that the description is for illustrative purposes only, since other processes, as will be detailed later, may be used.

Example 1.—900 grams of coagulated rubber, such as that known as "smoked sheet" are broken down by any convenient process such as the successive passing of the rubber through a set of compounding rolls or, more conveniently for this purpose, in a dough-type mixer such as a "Baker-Perkins" mixer. The rubber mass is then subjected to prolonged working in a dough mixer, the jacket of which is maintained at a temperature of 85°–90° C., and to it is added a mixture of approximately equal parts of water and a liquid or "A stage" phenolic condensation product such as that sold to the trade as "Redmanol AR-0014".

This resin is a reddish, viscous, oily liquid of about the consistency of molasses. It is miscible with water in all proportions from 0 to about 100 parts water per 100 parts resin. Its density at ordinary temperatures is about 1.16 grams per cubic centimeter. Chemical analysis shows that it contains up to about 12% free phenols but it gives no reaction for free aldehydes. It is presumed to be a mixture of the partial reaction product of a phenol and formaldehyde (or some substance which liberates formaldehyde such as hexamethylenetetramine or paraformaldehyde), a free phenol, and a hardening agent such as hexamethylenetetramine which decomposes to yield formaldehyde and ammonia under the influence of heat, the ammonia acting as a catalyst to promote the reaction between the phenol and the aldehyde, as a result of which the liquid, upon heating, first thickens and eventually hardens to the infusible and insoluble "C stage".

It will be found to be advisable, but not essential, to add the liquid rather slowly (say 2 or 3 cubic centimeters at a time) in the early stages of the process, since, if it be added too fast, the rubber tends to separate into balls which require prolonged working to combine. As the process continues, larger quantities of liquid can be added each time and the temperature can gradually be lowered to 30°–35° C. by the time the mixture consists of equal parts of rubber and liquid. The addition of liquid and the kneading are then continued until the proportion of liquid to rubber by weight is approximately 2 to 1. The rubber in the mixture is now very short and rather soft. The bowl of the mixer is then covered so that the temperature may be raised throughout the mix at the rate of about 3° C. per minute. As the temperature is increased, the mass becomes softer and shorter until finally, at about 90°–100° C. the phases become inverted and the mixture becomes fluid and can be poured. Such heating can be effected at any suitable elevated temperature, but at a temperature lower than that which hardens the resin.

The resultant liquid appears, under the microscope, to consist of a substantially homogeneous dispersion of small microscopic particles of rubber in the liquid resin. It is, however, unstable to the extent that, if left standing without agitation for about 24 hours or more, it will be found that a "cream" which is relatively high in rubber content (about 70 parts rubber to 30 parts resin) has risen to the top of the mixture and can be skimmed off. This cream, which might be described more accurately as a butter, has the consistency of a thick paste and seems to consist of very finely divided rubber particles wet with the resin-water mixture. Upon washing with water, the resin can be removed, whereupon the color changes from brown to cream or even white, depending upon the thoroughness with which the resin is removed. If, instead of lowering the proportion of resin, it is desired to increase it, the paste can be mixed with more liquid resin as required.

Still another method of varying the proportion of rubber is to mix the rubber-resin-water dispersion with a dispersion of rubber in water.

It will be seen that by starting with this paste and either extracting with water to reduce the resin content, adding a dispersion of rubber in water, or by adding a liquid resin or a solid resin such as an alkyd resin in the soluble and fusible or so-called "A stage", the resin or rubber content of the dispersion may be varied from about 1% to about 99% by weight with respect to each other. If a solid resin is added, it dissolves in the liquid resin or in the water present.

As an alternative method of making a dispersion in which the ratio of resin to rubber is greater than unity, the following procedure may be followed:

*Example 2.*—Liquid resin is mixed into broken-down rubber at 38–50° C., until the weight of liquid resin is from 1½ to 2 times that of the rubber, and the solid mass is converted to a liquid by heating and mixing as before. If the proportion of rubber in this mixture is still too high, the resin content can be increased by the addition of more liquid resin (which is miscible with the resin-rubber dispersion) or by mixing solid resin in the liquid. Thus dispersions of rubber particles in liquid resin can be produced having a resin content of up to 99%.

*Example 3.*—Into 900 grams of smoked sheet rubber, which has been broken down by any convenient means, mix 100 grams of a liquid resin such as that known by the trade name "Redmanol AR-0014". When the resin is all thoroughly mixed with rubber, the mass is appreciably softened. 60 grams of bentonite or other dispersing agent are then added and thoroughly incorporated with the rubber-resin mixture. If the resin and bentonite addition has been made on rolls, the mass is then transferred to a dough type mixer, and the temperature of the mixer is adjusted to 54–60° C. Water is then added while the mass is worked in the mixer until the weight of the mixture is increased to about 2,000 grams. The bowl of the mixer is then covered and the temperature of the jacket is raised at the rate of about 3° C. per minute while working the mixture, until the previously solid mass softens and finally changes to a liquid. The temperature of the jacket is then lowered and the liquid is cooled to a moderate temperature when it can be removed and screened to remove any large pieces of rubber which it may contain.

The dispersion according to this invention may be used for a large number of purposes, for example in the bonding of abrasive wheels, etc., as claimed in our co-pending application Serial No. 548,254, filed July 1, 1931.

While we have given specific materials in the examples above, we do not mean to limit ourselves to either the materials or to the exact details of the processes cited. Where it is not intended that water shall be added, we may, for example, use, instead of the liquid resin mentioned, an "A stage" phenolic condensation product such as is known by the trade name "Durite No. 270" (a phenolic condensation product), or that known by the trade name "Redmanol AR-540", or a urea-formaldehyde resin a liquid stage.

Also, various kinds and amounts of fillers or compounding ingredients may be added. For instance, certain of the metallic oxides commonly used in the rubber industry, and more particularly magnesium oxide and ferric oxide, have a beneficial effect. Moreover, certain other fillers, apparently chemically inert toward resins, as for instance pulverized flint and silicon carbide fines, are also beneficial for some applications of this composition as a heat hardenable bond, as they apparently stiffen and strengthen the bond.

Furthermore, the exact sequence of steps in the process need not be followed, as for instance, in Example 3, the bentonite may be added before, instead of after the resin, or the resin and bentonite may be added alternately. Similarly, in Example 1, we may mix the resin and water and add this to the rubber or we may mix the rubber and resin and then add the water.

According to this invention, it is possible to make a graduated series of coagulated rubber-liquid resin dispersions, in which the contents of either rubber or resin may be varied from about 1 to about 99% by weight with respect to each other.

We claim as our invention:

1. A composition of matter comprising a cream relatively high in rubber content concentrated from a liquid dispersion of vulcanizable previously coagulated rubber in a liquid comprising a normally liquid synthetic resin.

2. A liquid composition of matter comprising unvulcanized previously coagulated rubber dispersed in a normally liquid synthetic resin.

3. A liquid composition of matter comprising unvulcanized previously coagulated rubber dispersed in an aqueous liquid containing a normally liquid synthetic resin.

4. A liquid composition of matter comprising unvulcanized previously coagulated rubber dispersed in an aqueous liquid containing a normally liquid synthetic resin and bentonite.

5. In the process of making a liquid dispersion of rubber, the steps which consist of mixing a liquid comprising a normally liquid synthetic resin into a mass of unvulcanized previously coagulated rubber while maintaining the rubber in the continuous phase, and then inverting the phases whereby there is formed a dispersion of minute particles of the rubber suspended in the liquid.

6. In the process of making a liquid dispersion of rubber, the steps which consist of mixing a liquid comprising a normally liquid synthetic resin and water into a mass of unvulcanized previously coagulated rubber while maintaining the rubber in the continuous phase, and then inverting the phases whereby there is formed a dispersion of minute particles of the rubber suspended in the liquid.

7. The process which comprises mixing a liquid comprising a normally liquid synthetic resin into a mass of unvulcanized previously coagulated rubber, while maintaining the rubber in the continuous phase and heating the mass until the phases invert and there is formed a dispersion of minute particles of the rubber suspended in the liquid.

8. The process which comprises mixing a liquid comprising a normally liquid synthetic resin into a mass of unvulcanized previously coagulated rubber, while maintaining the rubber in the continuous phase, heating the mass until the phases invert and there is formed a dispersion of minute particles of the rubber suspended in the liquid, cooling the liquid and permitting it to stand, and separating the creamy layer of pasty consistency which is formed upon standing.

OSBORNE L. MAHLMAN.
RAYMOND C. BENNER.